US009501499B2

(12) United States Patent
Sanio et al.

(10) Patent No.: US 9,501,499 B2
(45) Date of Patent: Nov. 22, 2016

(54) METHODS AND SYSTEMS FOR CREATING IMAGE-BASED CONTENT BASED ON TEXT-BASED CONTENT

(71) Applicant: Google Inc., Mountain View, CA (US)

(72) Inventors: Jason Robert Richard Sanio, Mountain View, CA (US); Courtney Hampson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 491 days.

(21) Appl. No.: 14/058,702

(22) Filed: Oct. 21, 2013

(65) Prior Publication Data

US 2015/0112980 A1 Apr. 23, 2015

(51) Int. Cl.
*G06F 7/00* (2006.01)
*G06F 17/30* (2006.01)
*G06Q 30/02* (2012.01)

(52) U.S. Cl.
CPC ... *G06F 17/30265* (2013.01); *G06F 17/30244* (2013.01); *G06F 17/30864* (2013.01); *G06F 17/30867* (2013.01); *G06Q 30/0276* (2013.01)

(58) Field of Classification Search
CPC .................... G06F 17/30864; G06F 17/30867
USPC ......................................................... 707/728
See application file for complete search history.

(56) References Cited

U.S. PATENT DOCUMENTS

| | | | | |
|---|---|---|---|---|
| 6,400,996 | B1 * | 6/2002 | Hoffberg | G05B 19/0426 370/218 |
| 7,251,637 | B1 * | 7/2007 | Caid | G06F 17/30256 706/15 |
| 8,429,173 | B1 * | 4/2013 | Rosenberg | G06F 17/30247 707/748 |
| 8,583,263 | B2 * | 11/2013 | Hoffberg | G05B 15/02 340/3.71 |
| 8,676,803 | B1 * | 3/2014 | Leung | G06F 17/30268 707/737 |
| 8,799,269 | B2 * | 8/2014 | Friedlander | G06F 17/30979 707/713 |
| 2007/0233656 | A1 * | 10/2007 | Bunescu | G06F 17/278 |
| 2007/0237401 | A1 * | 10/2007 | Coath | G06K 9/6807 382/232 |
| 2008/0319844 | A1 | 12/2008 | Hua et al. | |
| 2009/0012863 | A1 | 1/2009 | Saephan | |
| 2009/0019013 | A1 * | 1/2009 | Tareen | G06F 17/30722 |
| 2009/0228802 | A1 | 9/2009 | Shan et al. | |
| 2010/0278453 | A1 * | 11/2010 | King | G06Q 10/10 382/321 |
| 2012/0310749 | A1 | 12/2012 | Everingham | |

(Continued)

OTHER PUBLICATIONS

International Search Report and Written Opinion on PCT/US2014060864 dated Jan. 9, 2015.

(Continued)

*Primary Examiner* — Mark E Hershley
(74) *Attorney, Agent, or Firm* — Foley & Lardner LLP; John D. Lanza

(57) ABSTRACT

Systems and methods for creating image-based content based on text-based content. A data processing system receives a text-based content item based on which an image-based content item is to be created. The data processing system determines a context of the text-based content item based on the content of the text-based content item and the content of a landing page associated with the text-based content item. The data processing system determines one or more search terms from the determined context of the text-based content item. The data processing system then identifies from an image database, one or more candidate images that match at least one of the search terms determined from the context of the text-based content item. The data processing system then creates an image-based content item based on the text-based content item using at least one of the candidate images.

20 Claims, 5 Drawing Sheets

(56) References Cited

U.S. PATENT DOCUMENTS

2013/0110627 A1   5/2013  Guha
2013/0132364 A1   5/2013  Udupa et al.
2014/0006129 A1*  1/2014  Heath ................ G06Q 30/0222
                                                         705/14.23

OTHER PUBLICATIONS

International Preliminary Report on Patentability on PCT/US2014/060864 dated May 6, 2016.

* cited by examiner

METHODS AND SYSTEMS FOR CREATING IMAGE-BASED CONTENT BASED ON TEXT-BASED CONTENT

BACKGROUND

Historically, third-party content items displayed alongside search results have been text-based. Recently, it has been found that image-based third-party content have a higher click through rate than text-based third-party content, so there is a desire to provide an easy way for third-party content providers to create image-based third-party content items at scale. The majority of online advertisers are small and medium businesses that don't have the creative budget and oftentimes, also lack the technical ability to create compelling image-based third-party content.

SUMMARY

At least one aspect is directed to a computer implemented method for creating image-based content based on text-based content. A data processing system receives a text-based content item based on which an image-based content item is to be created. The data processing system determines a context of the text-based content item based on the content of the text-based content item and the content of a landing page associated with the text-based content item. The data processing system determines one or more search terms from the determined context of the text-based content item. The data processing system then identifies from an image database, one or more candidate images that match at least one of the search terms determined from the context of the text-based content item. The data processing system then creates an image-based content item based on the text-based content item using at least one of the candidate images.

In some implementations, the data processing system receives an indication to automatically create an image-based content item from the text-based content item. In some implementations, the data processing system can determine a context of the text-based content item by performing clustering of the content of the landing page to identify landing page keyword clusters and determining a context of the text-based content item based in part on the generated landing page keywords clusters.

In some implementations, the data processing system can determine a context of the text-based content item by determining a weight of one or more of the landing page keyword clusters and ranking the landing page keyword clusters according to their weight. In some implementations, the weight of a landing page keyword cluster indicates a relevance of the content of the landing page to the landing page keyword cluster.

In some implementations, the data processing system can identify bidding keywords associated with the text-based content item on which bids are placed. The data processing system can determine content keywords from the content of the text-based content item. The data processing system can determine a context of the text-based content item based on the bidding keywords, content keywords and the landing page keyword clusters.

In some implementations, the data processing system can determine for each of the candidate images, a contextual relevance score of the candidate image from context-related attributes associated with a candidate image of the candidate images. The contextual relevance score indicates a relevance of the candidate image to the context of the text-based content item. The data processing system can then rank the candidate images based on their contextual relevance score.

In some implementations, the data processing system can determine a visual attribute score of a candidate image from visual attributes of the image. In some implementations, the visual attribute score indicates a visual appeal level for an appearance of image-based content item that includes the candidate image. The data processing system can then rank the candidate images based on their visual attribute score and contextual relevance score In some implementations, the data processing system can create an image-based content item using at least one of the candidate images by selecting a target image from the candidate images based on a contextual relevance score of the target image.

In some implementations, the data processing system can receive a request to display a content item including display-related information associated with a computing device on which to display the content item. The data processing system then selects for display, an image-based content item based in part on the display-related information included in the request.

In some implementations, the data processing system provides the created image-based content item for display in response to receiving a request to display a content item. In some such implementations, the data processing system monitors performance of the image-based content item provided for display. The data processing system can modify a contextual relevance score of the image used to create the image based content item in response to monitoring the performance of the image-based content item.

At least one aspect is directed to a computer implemented system for creating image-based content based on text-based content. The system includes a data processing system that has a content item analysis module, an image selection module and an image based content selection module. The data processing system can include a memory storing processor-executable instructions and a processor configured to execute the processor executable instructions. In some implementations, the processor can receive a text-based content item based on which an image-based content item is to be created. The processor can determine a context of the text-based content item based on the content of the text-based content item and the content of a landing page associated with the text-based content item. The processor determines one or more search terms from the determined context of the text-based content item. The processor then identifies from an image database, one or more images that match at least one of the search terms determined from the context of the text-based content item. The processor then creates an image-based content item based on the text-based content item using at least one of the identified images.

In some implementations, the processor receives an indication to automatically create an image-based content item from the text-based content item. In some implementations, the processor can determine a context of the text-based content item by performing clustering of the content of the landing page to identify landing page keyword clusters and determining a context of the text-based content item based in part on the generated landing page keywords clusters.

In some implementations, the processor can determine a context of the text-based content item by determining a weight of one or more of the landing page keyword clusters and ranking the landing page keyword clusters according to their weight. In some implementations, the weight of a landing page keyword cluster indicates a relevance of the content of the landing page to the landing page keyword cluster.

In some implementations, the processor can identify bidding keywords associated with the text-based content item on which bids are placed. The processor can determine content keywords from the content of the text-based content item. The processor can determine a context of the text-based content item based on the bidding keywords, content keywords and the landing page keyword clusters.

In some implementations, the processor can determine for each of the candidate images, a contextual relevance score of the candidate image from context-related attributes associated with a candidate image of the candidate images. The contextual relevance score indicates a relevance of the candidate image to the context of the text-based content item. The processor can then rank the candidate images based on their contextual relevance score.

In some implementations, the processor can determine a visual attribute score of a candidate image from visual attributes of the image. In some implementations, the visual attribute score indicates a visual appeal level for an appearance of image-based content item that includes the candidate image. The processor can then rank the candidate images based on their visual attribute score and contextual relevance score In some implementations, the processor can create an image-based content item using at least one of the candidate images by selecting a target image from the candidate images based on a contextual relevance score of the target image.

In some implementations, the processor can receive a request to display a content item including display-related information associated with a computing device on which to display the content item. The processor then selects for display, an image-based content item based in part on the display-related information included in the request.

In some implementations, the processor provides the created image-based content item for display in response to receiving a request to display a content item. In some such implementations, the processor monitors performance of the image-based content item provided for display. The processor can modify a contextual relevance score of the image used to create the image based content item in response to monitoring the performance of the image-based content item.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
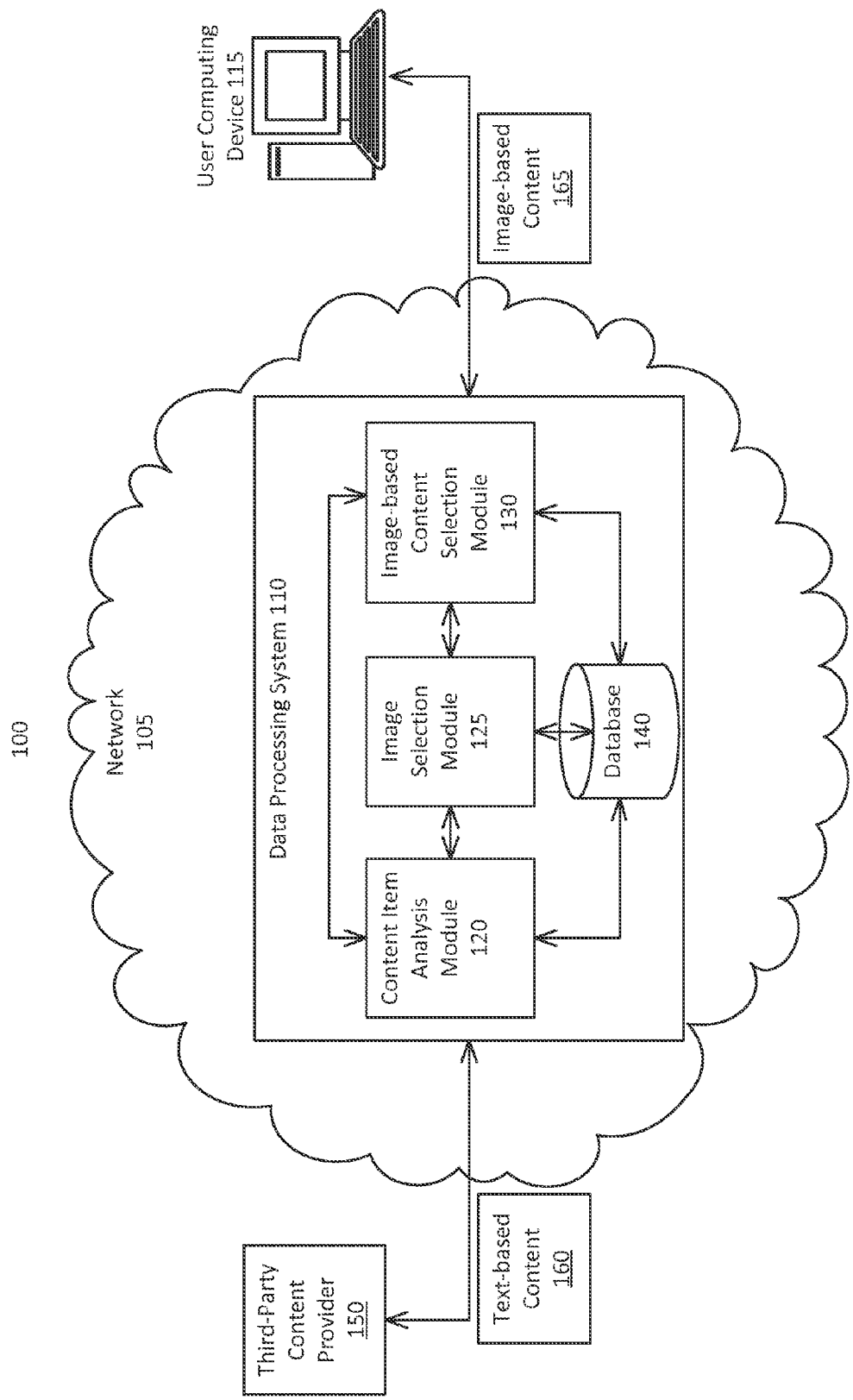
FIG. 1 is a block diagram depicting one implementation of an environment for creating image-based content based on text-based content, according to an illustrative implementation.

Following below are more detailed descriptions of various concepts related to, and implementations of, methods, apparatuses, and systems for creating image-based content based on text-based content. The various concepts introduced above and discussed in greater detail below may be implemented in any of numerous ways, as the described concepts are not limited to any particular manner of implementation. Examples of specific implementations and applications are provided primarily for illustrative purposes.

According to aspects of the present disclosure, a data processing system can receive a text-based content item based on which an image-based content item is to be created. The data processing system can determine a context of the text-based content item based on the content of the text-based content item and the content of a landing page associated with the text-based content item. In some implementations, the data processing system can determine the context of the text-based content item based in part on one or more bidding keywords associated with the text-based content items on which bids can be placed. In some implementations, the data processing system can perform clustering of the content of the landing page to identify landing page keyword clusters and determine a context of the text-based content item from the landing page keywords clusters.

The data processing system can determine one or more search terms from the determined context of the text-based content item. In some implementations, the search terms can be bidding keywords, content keywords included in the text-based content item and words included in the content of the landing page. In some implementations, the data processing system can retrieve search terms from another document or database using one or more of the bidding keywords, content keywords and the words included in the content of the landing page. For example, if some of the identified keywords included "Nike," "Roger Federer," and "sports," the data processing system can determine "tennis" to be one of the search terms. In some implementations, the data processing system can assign weights to the bidding keywords, content keywords and one or more words included in the content of the landing page. Based on their assigned weights, the data processing system can then determine one or more of the search terms. In some implementations, the data processing system can assign bidding keywords a greater weight than a keyword associated with the content of the landing page.

The data processing system can identify, from an image database, one or more images that match at least one of the search terms determined from the context of the text-based content item. The image database can include images from a plurality of websites. The images can include images provided by one or more users via computing devices. In some implementations, the images can be royalty free images or royalty based images.

The data processing system can identify a candidate image from the identified images and determine, from context-related attributes associated with the candidate image, a contextual relevance score of the candidate image. The contextual relevance score can indicate a relevance of the candidate image to the context of the text-based content item. The data processing system can then rank the candidate images based on their contextual relevance score. In some implementations, the data processing system can determine, from visual attributes associated with the image, a visual attribute score of a candidate image from the identified images. The visual attribute score can indicate how visually appealing an image-based content item that includes the candidate image will appear when displayed. In some such implementations, the data processing system can then rank the candidate images based on their visual attribute score and contextual relevance score.

The data processing system can create an image-based content item corresponding to the text-based content item using at least one of the identified images. In some implementations, the data processing system can select an image from the identified images based on the contextual relevance score of the image. In some implementations, the data processing system can also select an image based on the visual attribute score of the image. The data processing system can then use the selected images to create image-based content items. The created image-based content items can be stored in a database. The data processing system can be configured to retrieve the image-based content items from the database in response to receiving a request to serve an image-based content item.

The data processing system can receive a request to display a content item. The request can include visual attribute based information associated with a computing device on which the content item is to be displayed. In some implementations, the data processing system can select one of the created image-based content items based on the visual attributed information associated with the computing device. As an example, the request to display a content item can identify a type of computing device on which the content item is to be displayed, the location of the computing device, information associated with a user of the computing device, information associated with the publisher's web page on which the image-based content item is to be displayed, amongst others. The data processing system can use the information included in the request or derived from information included in the request to select an image-based content item for display. As such, it may be recognized that the image-based content item that is selected for display is selected not only based on the contextual relevance of the image-based content item but also visual attributes of the image-based content item and information associated with the computing device and the request itself.

The data processing system can be configured to create an image-based content item in response to receiving a request to display a content item on a computing device. In some such implementations, the data processing system can utilize information associated with the computing device to select an image to use to create the image-based content item, which can then be provided to the computing device for display.

The data processing system can be configured to monitor the performance of the image-based content items provided for display. In some implementations, the data processing system can modify the contextual relevance score of the image used to create the image-based content item in response to the performance of the image-based content item.

FIG. 1 is a block diagram depicting one implementation of an environment for. In particular, FIG. 1 illustrates a system 100 for creating image-based content based on text-based content. In particular, the system can be configured to create image-based third-party content items based on text-based third-party content items. Third-party content items are items that can be provided for display on a web page alongside primary content. Examples of third-party content items can include advertisements. Image-based third-party content items can be advertisements that include one or more images. Text-based third-party content items can be text-based advertisements, which are generally advertisements that are displayed as text and do not include images.

The system 100 includes at least one data processing system 110. The data processing system 110 can include a processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EE-PROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105. In some implementations, the data processing system 110 can be configured to receive text-based content, create image-based content based on the text-based content and further select and serve the created image-based content items to a computing device. The data processing system 110 can include one or more processors or other logic devices such as a computing device having a processor to communicate via a network 105 with at least one user computing device 115. In some implementations, the user computing device 115 and the data processing system 110 can communicate with one another via the network 105.

The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The user computing device 115 may be any number of different user electronic devices, for example, a laptop computer, a desktop computer, a tablet computer, a smartphone, a digital video recorder, a set-top box for a television, a video game console, or any other computing device configured to communicate via the network 105. The user computing device can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The user computing device 115 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the user computing device 115 (e.g., a built-in display, microphone, etc.) or external to the housing of the user computing device 115 (e.g., a monitor connected to the user computing device 115, a speaker connected to the user computing device 115, etc.), according to various implementations. For example, the user computing device 115 may include an electronic display, which visually displays web pages using webpage data received from one or more content sources and/or from the data processing system 110 via the network 105.

The data processing system 110 can include at least one server. In some implementations, the data processing system 110 includes a content item analysis module 120, an image selection module 125 and an image-based content selection module 130. The data processing system can also include one or more content repositories or databases 140.

The content item analysis module 120 can be designed, constructed or configured to receive one or more text-based content items 160. In some implementations, a third-party content provider 150 can be configured to provide the text-based content item 160 to the data processing system 110. In some implementations, the third-party content provider 150 can submit the text-based content item 160 to participate in one or more advertising auctions. In some implementations, the third-party content provider 150 can be configured to submit a request to create an image-based content item 165 based on the text-based content item 160. An image-based content item 165 includes an image.

In some implementations, the content item analysis module 120 can be configured to automatically initiate the process of creating an image-based content item upon receiving the third-party content item. In some implementations, the content item analysis module 120 can be configured to initiate the process of creating an image-based content item upon receiving a request, instructions or an indication to create an image-based content item. In some implementations, the content item analysis module 120 can be configured to receive a request from a third-party content provider 150 providing the text-based content item 160 when the third-party content provider 150 submits the text-based content item 160 to the data processing system 110. In some implementations, the third-party content provider 150 can be configured to provide the text-based content item 160 via a user interface. In some implementations, the user interface can be configured to prompt the third-party content provider 150 to select an option to create an image-based content item from the text-based content item 160. In some implementations, the content item analysis module 120 can be configured to automatically identify one or more text-based content item 160 stored in a database, such as the database 140 and create one or more image-based content items 165 based on the text-based content item 160.

The content item analysis module 120 can be configured to analyze the text-based content item 160. As part of the analysis, the content item analysis module 120 can be configured to determine a context of the text-based content item 160. In some implementations, the content item analysis module 120 can determine the context of the text-based content item 160 based on one or more of the content of the text-based content item, the content of a landing page associated with the text-based content item, the third-party content provider 150, one or more keywords on which the bids are placed to display the text-based content item 160, content on the website with which the landing page is associated, other text-based content items 160 associated with the third-party content provider 150, amongst others.

In some implementations, the content item analysis module 120 can be configured to identify one or more words included in the text-based content item 160. In some implementations, the content item analysis module 120 can perform clustering of the words in the text-based content item to determine a context of the text-based content item. However, in some implementations, the words in the text-based content item may not be sufficient to provide a context of the text-based content item.

The content item analysis module 120 can be configured to perform clustering on the landing page associated with the text-based content item 160. By doing so, the content item analysis module 120 can be configured to generate one or more landing page keyword clusters. In some implementations, a clustering algorithm can be employed to identify different sections of a webpage, determine keyword clusters for each section of the webpage and further determine keyword clusters for the entire web page based on the keyword clusters of the different sections of the webpage. In some implementations, the content item analysis module 120 can determine a context of the text-based content item by determining a weight of one or more of the landing page keyword clusters and ranking the landing page keyword clusters according to their weight. In some implementations, the weight of a landing page keyword cluster indicates a relevance of the content of the landing page to the landing page keyword cluster.

In some implementations, the content item analysis module 120 can be configured to generate one or more website keyword clusters by performing clustering on one or more webpages of the website to which the landing page is associated or belongs. The website keyword clusters can include the landing page keyword clusters in addition to keyword clusters generated from other web pages of the website.

In addition, the content item analysis module 120 can be configured to identify one or more bidding keywords associated with the text-based content item 160. The bidding keywords are keywords on which the third-party content provider 150 places a bid in an advertising auction. In some implementations, the text-based content item 160 is selected for display if the third-party content provider 150 places a winning bid on a keyword.

In some implementations, the content item analysis module 120 can be configured to analyze other text-based content items associated with the third-party content provider 150. In some such implementations, the content item analysis module 120 can be configured to analyze text-based content items included in the same advertisement group (ad group) or advertisement campaign as the text-based content item 160. The analysis of the other text-based content items can include analyzing the content of the text-based content items, analyzing the content on the landing pages of the text-based content items and the bidding keywords associated with the text-based content items.

The content item analysis module 120 can be configured to use the various keyword clusters, the words included in the text-based content item and the bidding keywords to determine the context of the text-based content item 160. In some implementations, the content item analysis module 120 can assign weights to each of the landing page keyword clusters, the words included in the text-based content item 160 and the bidding keywords. In some implementations, the content item analysis module 120 can assign a greater weight to the words included in the text-based content item 160 and the bidding keywords relative to the landing page keyword clusters. In some other implementations, the content item analysis module 120 can assign a greater weight to the landing page keyword clusters relative to the text-based content item 160 and the bidding keywords. The content item analysis module 120 can then determine the context of the text-based content item 160 according to the assigned weights of each of the landing page keyword clusters, the website keyword clusters, the words included in the text-based content item 160 and the bidding keywords, amongst others.

In some implementations, the content item analysis module 120 can determine one or more search terms from the determined context of the text-based content item. In some implementations, the search terms can be terms included in the keyword clusters, words in the text-based content item 160 or the bidding keywords. The content item analysis module 120 can be configured to prioritize the search terms based on the search term's closeness to the context of the text-based content item 160. In some implementations, a search term derived from a keyword that has a greater weight may have a higher priority than a search term derived from a keyword that has a lesser weight.

The image selection module 125 can be designed, constructed or configured to identify one or more candidate images from an image database. The image selection module 125 can be configured to utilize the identified search terms to identify the candidate images. In some implementations, the image selection module 125 can be configured to identify candidate images that match the identified search terms. In some implementations, the image selection module can match context-related attributes associated with the images to the identified search terms. Examples of context-related attributes can include a file name, a description of the image, a file location or website or webpage on which the image was retrieved or identified, or some other information that can be used to help determine the context of the contents included in the image. In some implementations, the image selection module 125 can be configured to analyze images to identify the content of the images. The image selection module 125 can then determine a context of the image based on the identified content of the images. The context of the image can then be stored as a description of the image.

In some implementations, a third-party content provider 150 associated with the text-based content item 160 can be configured to provide one or more images from which the image selection module 125 can select candidate images. In some implementations, the third-party content provider 150 can also provide one or more image selection policies according to which the image selection module 125 can select candidate images. For example, the image selection policy can include a rule that identifies that only royalty-free images can be used. In some implementations, the image selection policy can include a rule that restricts images that do not require a license or permission from an owner of the image to be used. In some implementations, the image selection policy can include a rule that limits the type of images to be used to images found on the third-party content provider's website. In some implementations, the image selection policy can include a rule indicating that the images should contain particular colors or have a minimum threshold resolution. As such, the image selection module 125 can first filter the images from which the candidate images can be identified based on the image selection policy of the third-party content provider 150.

In some implementations, the image selection module 125 may provide the third-party content provider 150 the ability to authorize candidate images before they are used for crating image-based content items 165. In some implementations, the image selection module 125 may provide the third-party content provider 150 the ability to rate the identified candidate images, which can influence the ranking of the images when selecting target images from the candidate images for creating the image-based content items 165.

The image database from which candidate images can be identified can be configured to include a wide variety of images, including but not limited to images collected from a plurality of websites, images uploaded to one or more servers accessible by the data processing system, images provided by the third-party content providers, amongst other sources. The images can include copyrighted images, images that are free to use, images that may be used upon payment of a royalty, amongst others. The images can be of various sizes, shapes, colors, resolutions, file types, file sizes, amongst others. The images can be stored in the image database along with a corresponding file name, a description of the image as well as other information associated with the image, for example, the website or webpage from where the image can be accessed. In some implementations, the description of the image can include a description of the content of the image, the size and shape or dimensions of the image, colors used in the image, resolution of the image, a file type and file size of the image, amongst others.

The image selection module 125 can be configured to determine a contextual relevance score of the candidate image based on the context-related attributes associated with the image. In some implementations, the image selection module 125 can determine a contextual relevance score of each of the candidate images. The contextual relevance score may indicate a relevance of the candidate image to the context of the text-based content item. The image selection module 125 can then rank the candidate images based on their contextual relevance score. In some implementations, a higher ranked candidate image is more likely to be selected to create an image than a lower ranked candidate image.

In some implementations, the image selection module 125 can determine a visual attribute score of a candidate image from visual attributes of the image. In some implementations, the image selection module 125 can determine a visual attribute score of each of the candidate images. In some implementations, the visual attribute score indicates a visual appeal level for an appearance of image-based content item that includes the candidate image. In some such implementations, the visual attribute score indicates a visual appeal level for an appearance of image-based content item that includes the candidate image when the image-based content item is displayed. In some implementations, the visual attribute score indicates a visual appeal level for an appearance of the candidate image. The visual appeal level can provide a measure of the visual appeal of the appearance of the image. Higher resolution images are generally more visually appealing than lower resolution images. Similarly, objects that fit within the dimensions of an image are generally more visually appealing than images in which the objects do not fit within the dimensions of the image. that includes the same image content. Other factors used in determining visual attribute scores include dimensions of the image, resolution of the image, sharpness, brightness, contrast and hue of the image, object positioning within the image, amongst others. In some implementations, the image selection module 125 can be configured to rank the images based on their visual attribute score.

In some implementations, the image selection module 125 can be configured to rank the candidate images based on a combination of the contextual relevance score and the visual attribute score. In some implementations, the image selection module 125 can assign weights to each of the contextual relevance score and the visual attribute score and rank images based on the weights associated with contextual relevance score and the visual attribute score.

In some implementations, the image selection module 125 can be configured to create an image-based content item using at least one of the candidate images. In some implementations, the image selection module 125 can select a target image from the candidate images to use to create the image-based content item. In some implementations, the image selection module 125 may select the highest ranked candidate image as the target image. In some implementations, the image selection module 125 may create multiple image-based content items using highly ranked candidate images as the target images.

The image selection module 125 can be configured to create the image-based content item by inserting visible content included in the text-based content item on the target image with which to create the image-based content item. The image-based content item can therefore, include the target image and the visible content of the text-based content item. In some implementations, the image selection module 125 can be configured to position the text-based content items in areas of the target image that do not block an object shown the image. In some implementations, the image selection module 125 can select visual attributes in which to display the text. For example, the image selection module 125 can select attributes including but not limited to the font type, the size, the width and the color in which to display the text in the image-based content item. In some implementations, the image selection module 125 can determine the attributes in which to display the text based on the attributes of the text displayed on the landing page associated with the text-based content item 160 or a logo associated with the third-party content provider 150 providing the text-based content item 160.

The image-based content selection module 130 can be designed, constructed or configured to receive a request to display a content item including display-related information associated with a computing device, such as the computing device 115 on which to display the content item. The request can identify a web page on which the content item is to be displayed. The request to display a content-item can also include information associated with the computing device on which the content item is to be displayed. The information can identify the type of device on which the content item is being displayed, user information associated with the computing device, amongst others. The image-based content selection module 130 can select, based on the request, an image-based content item suitable for display on the computing device. The suitability of the image-based content item can be based in part on the contextual relevance of the content of the image-based content item to the webpage on which the image-based content item is being displayed and the computing device on which the image-based content item is being displayed. In some implementations, the suitability of the image-based content item can also be based on the visual suitability of the image-based content item relative to the webpage on which the image-based content item is being displayed and the display capabilities of the computer device on which the image-based content item is to be displayed. For example, the suitability of the image-based content item can be based on the relative size of the image-based content item to the content slot in which the image-based content item is to be displayed.

In some implementations, the image-based content selection module 130 provides the created image-based content item for display in response to receiving a request to display a content item. In some implementations, the image-based content selection module 130 can be configured to select an image-based content item that is created based on a text-based content item 160 that was selected in response to winning an advertising auction.

In some implementations, the image-based content selection module 130 can select an image-based content item 165 from a plurality of image-based content items that were created based on the selected text-based content item 160. In some implementations, the image-based content selection module 130 can select the image-based content item 165 that has the greatest likelihood to get the attention of a user associated with the computing device on which the image-based content item 165 is selected for display. In some implementations, the image-based content selection module 130 can be configured to identify an image-based content item as having the highest likelihood of getting the attention of the user based on the user's previous interactions with other image-based content items. For example, if the user has historically clicked on image-based content items that include bright colors, the image-based content selection module 130 may select an image-based content item having bright colors for display.

In some such implementations, the image-based content selection module 130 can be configured to monitor the performance of the image-based content items provided for display. The image-based content selection module 130 can be configured to monitor the click through rate, cost per click, or any other metric to determine the performance of a particular image-based content item. In some implementations, the image-based content selection module 130 may determine, responsive to monitoring the performance of the various image-based content items, that image-based content items that use a particular image or a particular type of image are most likely to get the attention of users. In some implementations, the image-based content selection module 130 can modify a contextual relevance score or visual attribute score of such images that are likely to get the attention of users to reflect the image's likelihood of getting a user's attention in response to monitoring the performance of the image-based content item.

The data processing system 110 can also include one or more data stores, such as the database 140. The database can be included in the data processing system 110. In some implementations, the database may be located remote to the data processing system but accessible by the data processing system. The database can store a wide variety of content. For example, the database can store the text-based content items and information associated with the text-based content items. For example, the database can be configured to store the context of the text-based content item 160 after the context is determined as well as advertising keywords associated with the text-based content items and keyword clusters determined from landing pages and websites associated with the text-based content items. The database 140 can also include the image database, which can include the images or pointers to the images from which candidate images can be identified. The image database can also store descriptions and other details associated with each of the images including visual attributes and the visual attribute scores of the images. The database can also store the image-based content items created by the data processing system 110 including details associated with the image-based content item. Examples of such details can include their performance history, the context of the image-based content items, amongst others. The database 140 can also maintain a log to monitor the performance of each of the image-based content items and images such that the logged information can be used to improve the image selection process for selecting images to be used to create and display the image-based content items.

The data processing system 110 can include one or more additional modules to provide additional features. In particular, the data processing system 110 can include a third-party content provider user interface that allows the third-party content provider 150 to authorize or rate candidate images identified by the image selection module 125. The data processing system 110 can also include a licensing module that is configured to manage the rights, permissions and licenses associated with one or more images in the image database. The licensing module can be configured to identify if an image is a royalty-based image or if the image needs permission or a license from the owner of the image to be used to create image-based content items. In some implementations, the licensing module can also be configured to manage payments associated with images that include a royalty payment. In some implementations, the use of a royalty-based image can be billed as part of an advertising auction bid or separately. The data processing system 110 can negotiate rights and any associated licensing fees with image owners for the use of these images. The data processing system 110 in turn may charge the third-party content provider 150 a fee to use such images to create and display image-based content items.

Figure 2:
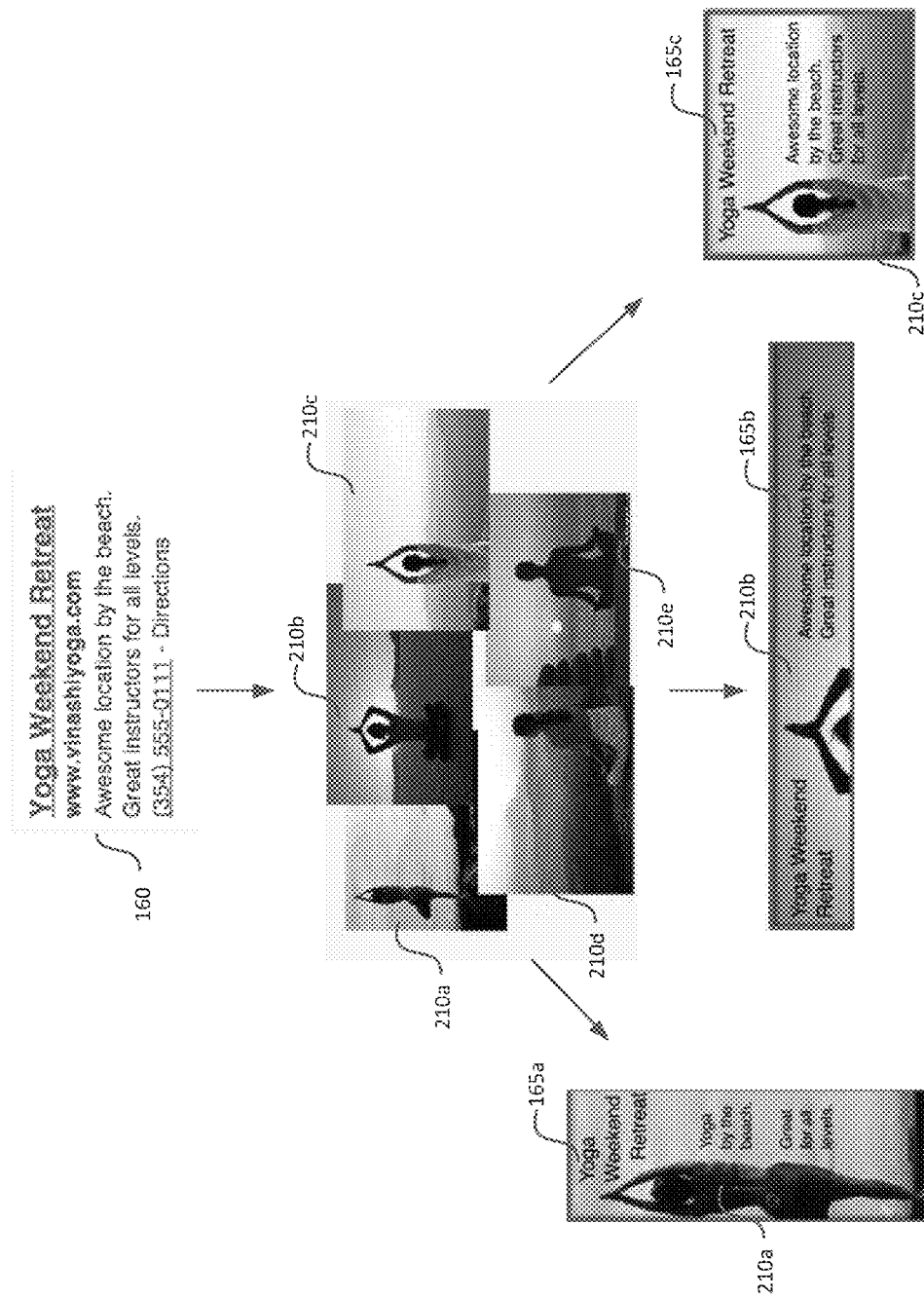
FIG. 2 is a process flow diagram depicting a process flow for creating image-based content items from a text-based content item.

FIG. 2 is a process flow diagram depicting a process flow for creating image-based content items from a text-based content item. As shown in FIG. 2, an example of a text-based content item 160 is shown. The example text-based content item 160 includes a header "Yoga Weekend Retreat," a web address "www.vinashiyoga.com," which may be an address of the landing page or an address of the home page of the third-party content provider. The text-based content item further includes a description "Awesome location by the beach. Great instructors for all levels." In some implementations, the text-based content item can also include a phone number and a link to directions to a physical location associated with the third-party content provider providing the advertised service or product. In some implementations, the phone number can be a link, which when clicked on can establish a telephone call between the listed phone number and a phone service executing on the computing device on which the third-party content item is displayed or a phone associated with the user of the computing device.

From the text-based content item, the data processing system can identify a plurality of search terms from the text-based content item 160, which are then used by the data processing system to identify a plurality of candidate images 210. Based on the context of the text-based content item 160, the data processing system identified five candidate images 210a-210e as shown. These images were identified as candidate images based on their context-related attributes. The images all appear to be related to yoga. In particular, each of images includes a female performing yoga. In some implementations, the images selected may have been selected if a search term, for example, yoga, matched content in image file name, the image was associated with a yoga-related website, or if the description of the image included the word yoga, amongst others.

The data processing system can rank these images based on one or more of their contextual relevance score and visual attributes score. The highest ranked images can then be used to create image-based content items 165. In the example shown in FIG. 2, three example image-based content items 165a-165c are shown. The image-based content item 165a uses the image 210a, the image-based content item 165b uses the image 210b and the image-based content item 165c uses the image 210c. Each of these image-based content items 165 are based on the text-based content item 160. Each of the image-based content items 165a-165c includes different images but includes the same or similar text and can be associated with the same landing page. The text included in each of the image-based content items 165a-165 can be based on the text-based content item 160. For example, each of the three image-based content items 165a-165c includes the same header as the text-based content item 160 also shown in FIG. 2. Moreover, the image-based content items 165b and 165c also include the same description as the text-based content item 160. These image-based content items can be created and stored in an image-based content item database, from where the image-based content items can be retrieved for serving to a computing device, such as the computing device 115.

Figure 3:
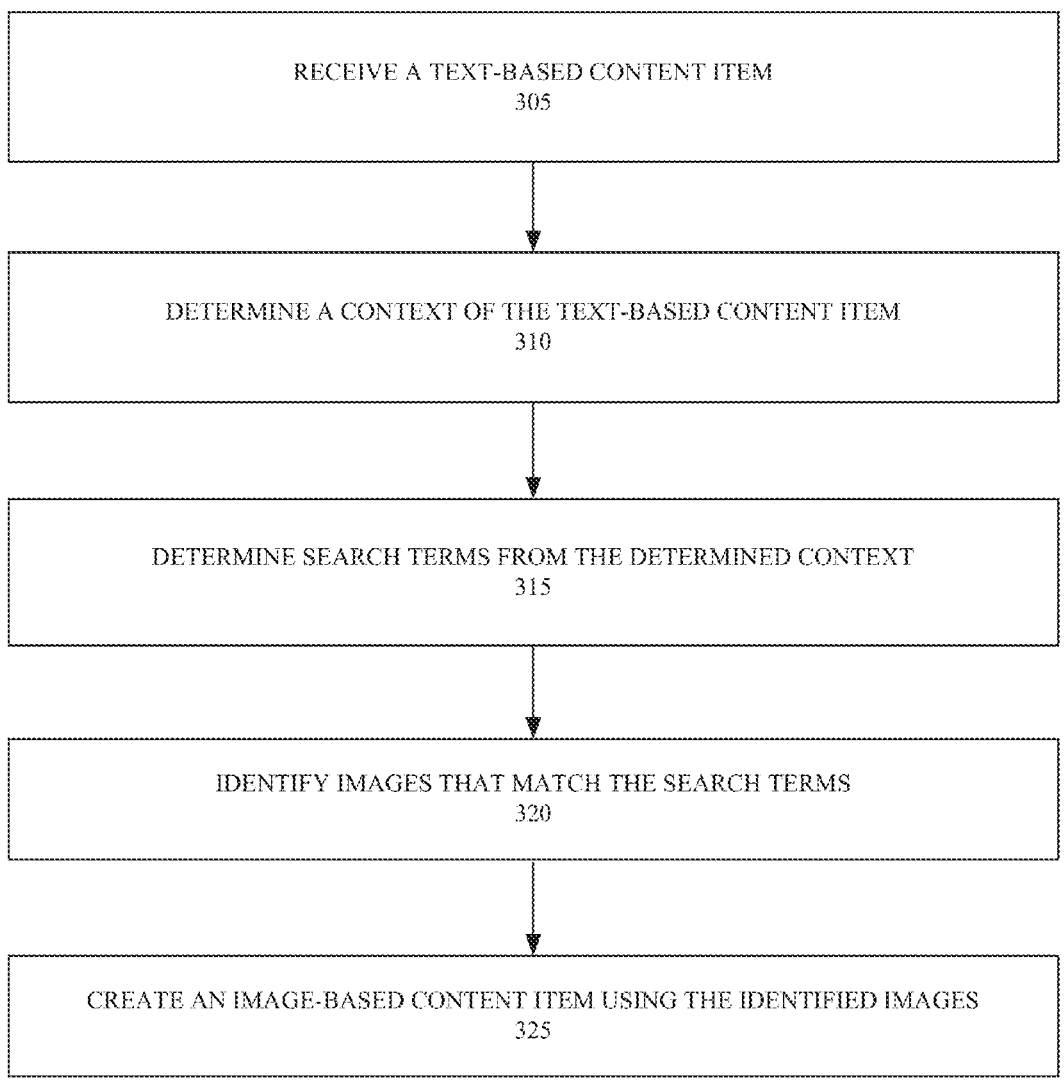
FIG. 3 is a flow diagram depicting one implementation of the steps taken to create image-based content based on text-based content.

FIG. 3 is a flow diagram depicting one implementation of the steps taken to create image-based content items. In particular, FIG. 3 illustrates a flow diagram depicting a method 300 for creating image-based content based on text-based content. In brief overview, the content item analysis module of the data processing system receives a text-based content item based on which an image-based content item is to be created (BLOCK 305). The content item analysis module then determines a context of the text-based content item based on the content of the text-based content item and the content of a landing page associated with the text-based content item (BLOCK 310). The content item analysis module can then determine one or more search terms from the determined context of the text-based content item (BLOCK 315). The image selection module of the data processing system identifies one or more images from an image database that match at least one of the search terms determined from the context of the text-based content item (BLOCK 320). The content item analysis module then creates an image-based content item based on the text-based content item using at least one of the identified images (BLOCK 325).

In further detail, the data processing system receives a text-based content item based on which an image-based content item is to be created (BLOCK 305). In some implementations, a third-party content provider can be configured to provide the text-based content item to the data processing system. In some implementations, the third-party content provider can submit the text-based content item to participate in one or more advertising auctions. In some implementations, the third-party content provider can submit a request to create an image-based content item based on the text-based content item. In some implementations, the content item analysis module can automatically initiate the process of creating an image-based content item upon receiving the third-party content item. In some implementations, the content item analysis module can initiate the process of creating an image-based content item upon receiving a request, instructions or an indication to create an image-based content item. In some implementations, the third-party content provider can provide the text-based content item via a user interface. In some implementations, the user interface can be configured to prompt the third-party content provider to select an option to create an image-based content item from the text-based content item. In some implementations, the content item analysis module can be configured to automatically identify one or more text-based content item stored in a database, such as the database and create one or more image-based content items based on the text-based content item.

The data processing system then determines a context of the text-based content item based on the content of the text-based content item and the content of a landing page associated with the text-based content item (BLOCK 310). The content item analysis module can be configured to analyze the text-based content item to determine a context of the text-based content item. In some implementations, the content item analysis module can determine the context of the text-based content item based on one or more of the content of the text-based content item, the content of a landing page associated with the text-based content item, the third-party content provider, one or more keywords on which the bids are placed to display the text-based content item, content on the website with which the landing page is associated, other text-based content items associated with the third-party content provider, amongst others.

In some implementations, the content item analysis module can be configured to identify one or more words included in the text-based content item. In some implementations, the content item analysis module can perform clustering of the words in the text-based content item to determine a context of the text-based content item. The content item analysis module can perform clustering on the landing page associated with the text-based content item. By doing so, the content item analysis module can be configured to generate one or more landing page keyword clusters. In some implementations, a clustering algorithm can be employed to identify different sections of a webpage, determine keyword clusters for each section of the webpage and further determine keyword clusters for the entire web page based on the keyword clusters of the different sections of the webpage. In some implementations, the content item analysis module can determine a context of the text-based content item by determining a weight of one or more of the landing page keyword clusters and ranking the landing page keyword clusters according to their weight. In some implementations, the weight of a landing page keyword cluster indicates a relevance of the content of the landing page to the landing page keyword cluster. In some implementations, the content item analysis module can generate one or more website keyword clusters by performing clustering on one or more webpages of the website to which the landing page is associated or belongs. The website keyword clusters can include the landing page keyword clusters in addition to keyword clusters generated from other web pages of the website.

In addition, the content item analysis module can be configured to identify one or more bidding keywords associated with the text-based content item. The bidding keywords are keywords on which the third-party content provider places a bid in an advertising auction. In some implementations, the text-based content item is selected for display if the third-party content provider places a winning bid on a keyword.

In some implementations, the content item analysis module can be configured to analyze other text-based content items associated with the third-party content provider to determine the context of the text-based content item. In some such implementations, the content item analysis module can be configured to analyze text-based content items included in the same advertisement group or advertisement campaign as the text-based content item. The analysis of the other text-based content items can include analyzing the content of the text-based content items, analyzing the content on the landing pages of the text-based content items and the bidding keywords associated with the text-based content items.

The content item analysis module can be configured to use the various keyword clusters, the words included in the text-based content item and the bidding keywords to determine the context of the text-based content item. In some implementations, the content item analysis module can assign weights to one or more of the landing page keyword clusters, the words included in the text-based content item and the bidding keywords. The content item analysis module can then determine the context of the text-based content item according to the assigned weights of the landing page keyword clusters, the website keyword clusters, the description of the text-based content item and the bidding keywords.

The data processing system can then determine one or more search terms from the determined context of the text-based content item (BLOCK 315). In some implementations, the content item analysis module can determine one or more search terms from the determined context of the text-based content item. In some implementations, the search terms can be terms included in the keyword clusters, words in the text-based content item or the bidding keywords. The content item analysis module can be configured to prioritize the search terms based on the search term's closeness to the context of the text-based content item. In some implementations, a search term derived from a keyword that has a greater weight may have a higher priority than a search term derived from a keyword that has a lesser weight.

The data processing system identifies one or more images from an image database that match at least one of the search terms determined from the context of the text-based content item (BLOCK 320). The image selection module can identify one or more candidate images from an image database. The image selection module can be configured to utilize the identified search terms to identify the candidate images. In some implementations, the image selection module can be configured to identify candidate images that match the identified search terms. In some implementations, the image selection module can match context-related attributes associated with the images to the identified search terms. Examples of context-related attributes can include a file name, a description of the image, a file location or website or webpage on which the image was retrieved or identified, or some other information that can be used to help determine the context of the contents included in the image. In some implementations, the image selection module can be configured to analyze images to identify the content of the images. The image selection module can then determine a context of the image based on the identified content of the images. The context of the image can then be stored as a description of the image.

The image selection module can be configured to determine a contextual relevance score of the candidate image based on the context-related attributes associated with the image. In some implementations, the image selection module can determine a contextual relevance score of each of the candidate images. The contextual relevance score may indicate a relevance of the candidate image to the context of the text-based content item. The image selection module can then rank the candidate images based on their contextual relevance score. In some implementations, a higher ranked candidate image is more likely to be selected to create an image than a lower ranked candidate image.

In some implementations, the image selection module can determine a visual attribute score of a candidate image from visual attributes of the image. In some implementations, the image selection module can determine a visual attribute score of each of the candidate images. In some implementations, the visual attribute score indicates a visual appeal level for an appearance of image-based content item that includes the candidate image. In some such implementations, the visual attribute score indicates a visual appeal level for an appearance of image-based content item that includes the candidate image when the image-based content item is displayed. In some implementations, the visual attribute score indicates a visual appeal level for an appearance of the candidate image. The visual appeal level can provide a measure of the visual appeal of the appearance of the image. In some implementations, the image selection module can rank the images based on their visual attribute score.

In some implementations, the image selection module can rank the candidate images based on a combination of the contextual relevance score and the visual attribute score. In some implementations, the image selection module can assign weights to each of the contextual relevance score and the visual attribute score and rank images based on the weights associated with contextual relevance score and the visual attribute score.

The content item analysis module then creates an image-based content item based on the text-based content item using at least one of the identified images (BLOCK 325). In some implementations, the image selection module can select a target image from the candidate images to use to create the image-based content item. In some implementations, the image selection module may select the highest ranked candidate image as the target image. In some implementations, the image selection module may create multiple image-based content items using highly ranked candidate images as the target images.

The image selection module can be configured to create the image-based content item by inserting visible content included in the text-based content item on the target image with which to create the image-based content item. The image-based content item can therefore, include the target image and the visible content of the text-based content item. In some implementations, the image selection module can be configured to position the text-based content items in areas of the target image that do not block an object shown the image. In some implementations, the image selection module can select visual attributes in which to display the text. For example, the image selection module can select attributes including but not limited to the font type, the size, the width, and the color in which to display the text in the image-based content item. In some implementations, the image selection module can determine the attributes in which to display the text based on the attributes of the text displayed on the landing page associated with the text-based content item or a logo associated with the third-party content provider providing the text-based content item.

Figure 4:
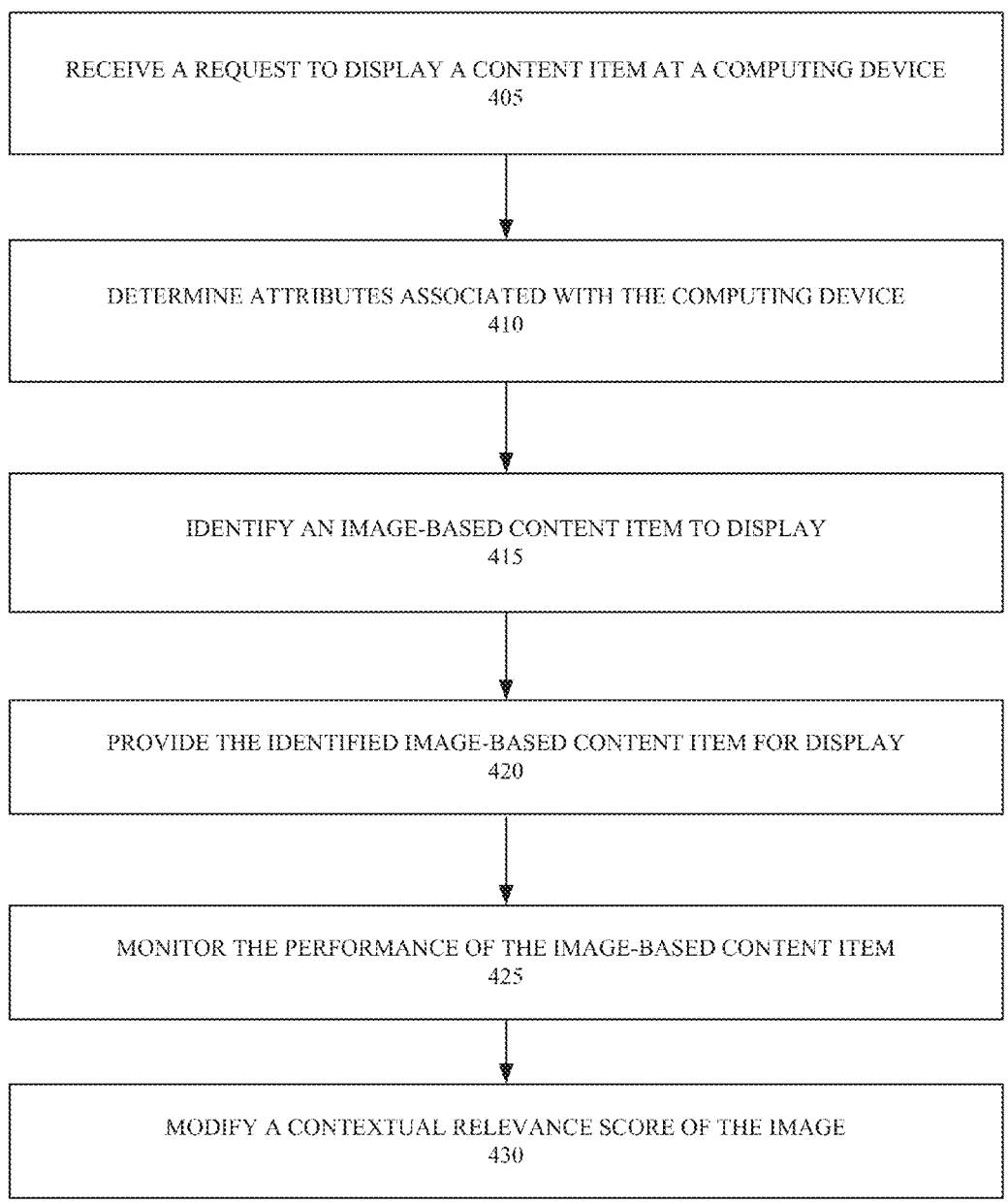
FIG. 4 is a flow diagram depicting one implementation of the steps taken to provide created image-based content for display.

FIG. 4 is a flow diagram depicting one implementation of the steps taken to provide created image-based content for display. In particular, FIG. 4 illustrates a flow diagram depicting a method 400 for providing image-based content items for display and monitoring their performance. In brief overview, the image-based content selection module receives a request to display a content item at a computing device (BLOCK 405). The image-based content selection module then determines attributes associated with the computing device (BLOCK 410). The image-based content selection module identifies an image-based content item to display (BLOCK 415). The image-based content selection module provides the identified image-based content item for display (BLOCK 420). The image-based content selection module monitors the performance of the image-based content item (BLOCK 425). The image-based content selection module then modifies a contextual relevance score of the image associated with the image-based content item (BLOCK 430).

The image-based content selection module receives a request to display a content item at a computing device (BLOCK 405). In some implementations, the image-based content selection module can receive a request to display a content item including display-related information associated with a computing device on which to display the content item. The request can identify a web page on which the content item is to be displayed. The request can be for a third-party content item, such as an advertisement.

The image-based content selection module then determines attributes associated with the computing device (BLOCK 410). In some implementations, the request to display a content item can also include information associated with the computing device on which the content item is to be displayed. The information can identify the type of device on which the content item is being displayed, user information associated with the computing device, amongst others. The image-based content selection module can select, based on the request, an image-based content item suitable for display on the computing device.

The image-based content selection module then identifies an image-based content item to display (BLOCK 415). In some implementations, the image-based content selection module identifies an image-based content item to display based on the contextual relevance of the image-based content item and attributes of the computing device. In some implementations, the image-based content selection module can identify an image-based content item from a plurality of candidate image-based content items. In some implementations, the candidate image-based content items all correspond to a text-based content item that participated in an auction and was selected to be displayed. In some implementations, the image-based content selection module can identify an image-based content item to display from a plurality of image-based content items that were created based on the winning text-based content item. In some implementations, the image-based content selection module can identify the image-based content item that has the greatest likelihood to get the attention of a user associated with the computing device on which the image-based content item is to be displayed. In some implementations, the image-based content selection module can be configured to identify an image-based content item as having the highest likelihood of getting the attention of the user based on the user's previous interactions with other image-based content items. For example, if the user has historically clicked on image-based content items that include bright colors, the image-based content selection module may select an image-based content item having bright colors for display.

The image-based content selection module can provide the identified image-based content item for display (BLOCK 420). In some implementations, the image-based content selection module provides the created image-based content item for display in response to receiving the request to display a content item. In some implementations, the image-based content item can be provided for display along with primary content associated with a website on which the image-based content item is to be displayed. In some implementations, the image-based content item can be provided for display in a third-party content slot of a web page.

The image-based content selection module can monitor the performance of the third-party content item (BLOCK 425). In some implementations, the image-based content selection module can be configured to monitor the performance of the image-based content items provided for display. The image-based content selection module can be configured to monitor the click through rate, cost per click, or any other metric to determine the performance of a particular image-based content item. The performance of the image-based content item can be compared to other image-based content items created based on the same text-based content item.

The image-based content selection module then modifies a contextual relevance score of the image (BLOCK 430). In some implementations, the image-based content selection module may identify an image associated with the image-based content item whose performance is being monitored. The image-based content selection module may determine a correlation between the image and the performance of the image-based content item by comparing the performance of the image-based content items created based on the same text-based content item but having different images. Based on the performance of the image-based content item using a particular image, the image-based content selection module can modify the contextual relevance score of the image to the context of the text-based content item from which the image-based content item was created. In particular, if the image-based content item using the particular image performs better than other images, the image-based content selection module may increase the contextual relevance score of the image relative to the text-based content item. Conversely, if the image-based content item using the particular image performs worse than other images, the image-based content selection module may decrease the contextual relevance score of the image relative to the text-based content item. In some implementations, the image-based content selection module may also modify the visual attribute score of the image in a similar manner.

Figure 5:
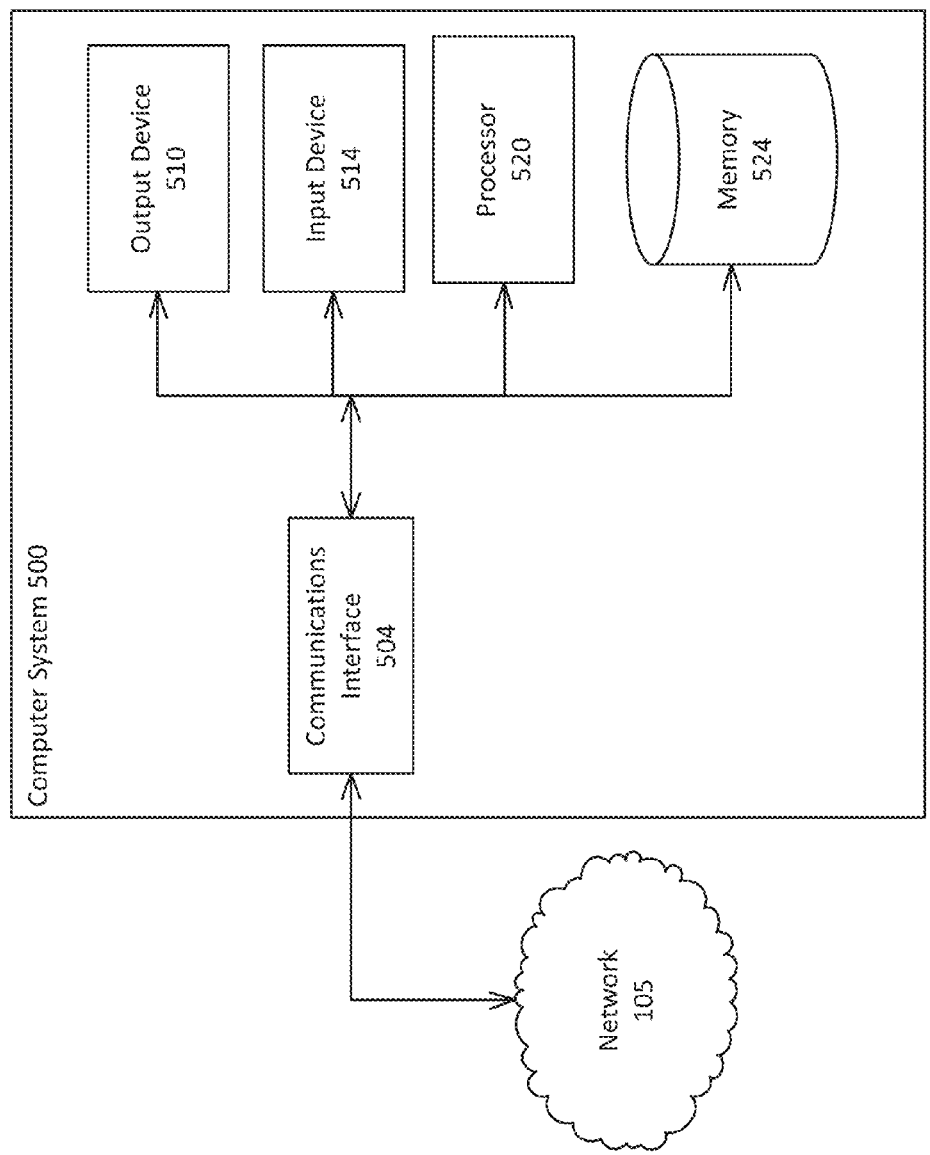
FIG. 5 is a block diagram illustrating an implementation of a general architecture for a computer system that may be employed to implement various elements of the systems and methods described and illustrated herein.

FIG. 5 shows the general architecture of an illustrative computer system 500 that may be employed to implement any of the computer systems discussed herein (including the system 100 and its components such as the content item analysis module 120, the image selection module 125 and the image-based content selection module 130) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 100 such as the content item analysis module 120, the image selection module 125 and the image-based content selection module 130.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 525 to store information related to one or more text-based content items, image-based content items, one or more images to be used to create image-based content items based on the text-based content items, and one or more statistics associated with the images, text-based content items and image-based content items. The memory 525 can include the database 140. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content item analysis module 120, the image selection module 125 and the image-based content selection module 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content item analysis module 120, the image selection module 125 and the image-based content selection module 130 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any program in any vertical in which image-based content can be created from text-based content. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for creating image-based content based on text-based content, comprising:
   receiving, by a data processing system, a text-based content item including a link to a landing page, the text-based content for serving in one or more text-based content slots of one or more information resources;
   determining, by the data processing system, a context of the text-based content item based on the content of the text-based content item and the content of the landing page accessible via the link included in the text-based content item;
   determining, by the data processing system, one or more search terms from the determined context of the text-based content item;
   identifying from an image database, by the data processing system, one or more candidate images that match at least one of the search terms determined from the context of the text-based content item;
   identifying, by the data processing system, text from the text-based content item; and
   creating, by the data processing system, an image-based content item, for serving in one or more image-based content slots of the one or more information resources, based on the text-based content item using at least one of the candidate images, the image-based content item including the text identified from the text-based content item and the link to the landing page associated with the text-based content item.

2. The method of claim 1, wherein receiving a text-based content item further comprises receiving an indication to automatically create an image-based content item from the text-based content item.

3. The method of claim 1, wherein determining a context of the text-based content item comprises:
   performing clustering of the content of the landing page to identify landing page keyword clusters; and
   determining a context of the text-based content item based in part on the identified landing page keyword clusters.

4. The method of claim 3, wherein determining a context of the text-based content item based in part on the identified landing page keyword clusters comprises:
   determining a weight of one or more of the landing page keyword clusters, the weight indicating a relevance of the content of the landing page to the one or more landing page keyword clusters associated with the weight; and
   ranking the landing page keyword clusters according to their weight.

5. The method of claim 3, wherein determining a context of the text-based content item comprises:
   identifying one or more bidding keywords associated with the text-based content item on which bids are placed;
   determining content keywords from the content of the text-based content item; and
   determining a context of the text-based content item based on the bidding keywords, content keywords and the landing page keyword clusters.

6. The method of claim 1, further comprising:
   determining, for each of the candidate images, from context-related attributes associated with the candidate image, a contextual relevance score of the candidate image indicating a relevance of the candidate image to the context of the text-based content item; and
   ranking the candidate images based on their contextual relevance scores.

7. The method of claim 6, further comprising:
   determining, for each of the candidate images, from visual attributes associated with the candidate image, a visual attribute score of the candidate image indicating a visual appeal level for an appearance of an image-based content item that includes the candidate image when the image-based content item is displayed; and
   ranking the candidate images based on their visual attribute scores and contextual relevance scores.

8. The method of claim 1, wherein creating an image-based content item using at least one of the candidate images comprises selecting a target image from the candidate images based on a contextual relevance score of the target image indicating a relevance of the target image to the context of the text-based content item.

9. The method of claim 1, further comprising:
   receiving, by the data processing system, a request to display a content item, the request including display-related information associated with a computing device on which to display the content item; and selecting, for display, an image-based content item based in part on display-related information included in the request.

10. The method of claim 1, further comprising:

providing the created image-based content item for display responsive to receiving a request to display a content item;

monitoring performance of the image-based content item provided for display; and responsive to monitoring the performance of the image-based content item, modifying a contextual relevance score of the image used to create the image-based content item, the contextual relevance score of the image indicating a relevance of the image to the context of the text-based content item.

11. A system for creating image-based content based on text-based content, comprising:

a data processing system having a content item analysis module, an image selection module and an image-based content selection module, the data processing system further comprising a memory storing processor-executable instructions; and a processor configured to execute the processor-executable instructors to:

receive a text-based content item including a link to a landing page, the text-based content for serving in one or more text-based content slots of one or more information resources;

determine a context of the text-based content item based on the content of the text-based content item and the content of the landing page accessible via the link included in the text-based content item;

determine one or more search terms from the determined context of the text-based content item;

identify from an image database, one or more candidate images that match at least one of the search terms determined from the context of the text-based content item;

identify text from the text-based content item; and create an image-based content item, for serving in one or more image-based content slots of the one or more information resources, based on the text-based content item using at least one of the candidate images, the image-based content item including the text identified from the text-based content item and the link to the landing page associated with the text-based content item.

12. The system of claim 11, wherein receiving a text-based content item further comprises receiving an indication to automatically create an image-based content item from the text-based content item.

13. The system of claim 11, wherein in determining a context of the text-based content item, the processor is further configured to:

perform clustering of the content of the landing page to identify landing page keyword clusters; and determine a context of the text-based content item based in part on the identified landing page keyword clusters.

14. The system of claim 13, wherein in determining a context of the text-based content item based in part on the identified landing page keyword clusters, the processor is further configured to:

determine a weight of one or more of the landing page keyword clusters, the weight indicating a relevance of the content of the landing page to the one or more landing page keyword clusters associated with the weight; and rank the landing page keyword clusters according to their weight.

15. The system of claim 13, wherein in determining a context of the text-based content item, the processor is further configured to:

identify one or more bidding keywords associated with the text-based content item on which bids are placed;

determine content keywords from the content of the text-based content item; and determine a context of the text-based content item based on the bidding keywords, content keywords and the landing page keyword clusters.

16. The system of claim 11, wherein the processor is further configured to:

determine, for each of the candidate images, from context-related attributes associated with the candidate image, a contextual relevance score of the candidate image indicating a relevance of the candidate image to the context of the text-based content item; and rank the candidate images based on their contextual relevance scores.

17. The system of claim 16, wherein, the processor is further configured to:

determine, for each of the candidate images, from visual attributes associated with the candidate image, a visual attribute score of the candidate image indicating a visual appeal level for an appearance of an image-based content item that includes the candidate image when the image-based content item is displayed; and rank the candidate images based on their visual attribute scores and contextual relevance scores.

18. The system of claim 11, wherein in creating an image-based content item using at least one of the identified images, the processor is further configured to select a target image from the candidate images based on a contextual relevance score of the target image indicating a relevance of the target image to the context of the text-based content item.

19. The system of claim 11, wherein, the processor is further configured to:

receive a request to display a content item, the request including display-related information associated with a computing device on which to display the content item; and select, for display, an image-based content item based in part on the display-related information included in the request.

20. The system of claim 11, wherein, the processor is further configured to:

provide the created image-based content item for display responsive to receiving a request to display a content item;

monitor performance of the image-based content item provided for display; and responsive to monitoring the performance of the image-based content item, modify a contextual relevance score of the image used to create the image-based content item, the contextual relevance score of the image indicating a relevance of the candidate image to the context of the text-based content item.

* * * * *